Patented Nov. 17, 1936

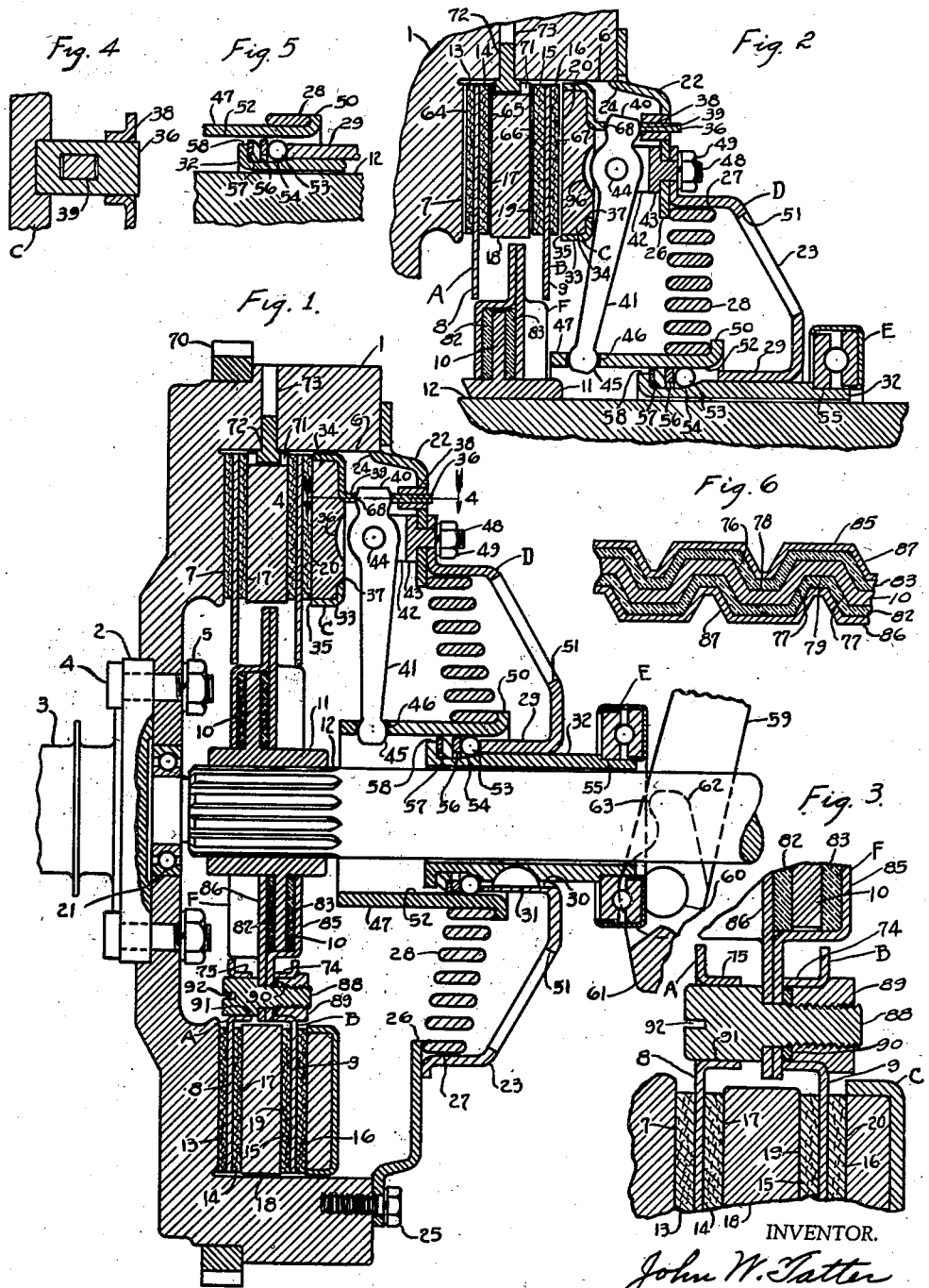

2,061,093

UNITED STATES PATENT OFFICE 2,061,093

CLUTCH

John W. Tatter, Detroit, Mich., assignor of one-half to George B. Ingersoll, Dearborn, Mich.

Application October 5, 1931, Serial No. 566,914

8 Claims. (Cl. 192—109)

My invention relates to improvements in clutches for motor vehicles, said clutches comprising friction members, and the objects of my improvements are, first, to provide a clutch with a plurality of friction disc members together with automatic means for taking up wear in the plurality of friction members; second, to provide a clutch having a pair of friction members slidably mounted on the other said friction members; third, to provide a clutch having a pair of friction members enclosing a vibration dampening member; fourth, to provide a clutch having a thrust member composed of two different kinds of material; fifth, to provide a clutch having a thrust member having a friction face of cast metal enclosed by pressed steel housing; sixth, to provide a thrust member made from sheet material, a portion of the sheet material being displaced from its normal plane to form the engaging portion for an operating member; and seventh, to provide a thrust member having non-scuffing characteristics together with lighter weight than is found in the ordinary type of thrust plate made from cast material.

I attain these objects by the mechanism illustrated in the accompanying drawing, in which—

Figure 1 is a sectional view of the clutch assembly within the flywheel of a motor, said view disclosing the clutch members in their engaged position; Fig. 2, a partial sectional view of the clutch assembly, said view disclosing the clutch in its disengaged position; Fig. 3, a partial sectional view of the friction members, said view disclosing the method of slidably mounting one of the friction members on the other of the pair of friction members; Fig. 4, a sectional view on the line 4—4, Fig. 1; Fig. 5, a partial longitudinal section disclosing a locking ball member in an unlocked or disengaged position, said partial section being taken on the centerline of the clutch assembly; and Fig. 6, a sectional view of the vibration dampening driven member, being developed along a radial section of the complete driven member assembly.

Similar numerals refer to similar parts throughout the several views.

The flywheel 1 is mounted on the flange 2 of the crank shaft 3 of an engine. The flywheel 1 is held on the flange 2 by the bolts 4 together with the nuts 5. The flywheel 1 is provided with the chamber 6 together with the friction face 7. The driven member assemblies A and B are provided respectively with the friction discs 8 and 9 and are suitably fastened and connected to the flange portion 10 of the hub 11 as hereinafter disclosed, the hub 11 being suitably mounted on the splines of the shaft 12. The friction members 13 and 14 are suitably fastened to the friction disc 8 and the friction members 15 and 16 are suitably fastened to the friction disc 9. The friction member 13 is disposed between the friction face 7 of the flywheel 1 and the face of the friction disc 8. The friction member 14 is disposed between the face of the friction disc 8 and the friction face 17 of the drive member 18. The friction member 15 is disposed between the friction face 19 of the drive member 18 and the face of the friction disc 9. The friction member 16 is disposed between the face of the friction disc 9 and the friction face 20 of the thrust member 10 assembly C. The shaft 12 is supported at its front end in the bearing assembly 21, which is mounted in a recess of the flywheel 1 and at its rear end in a bearing assembly (not shown), which is suitably mounted in the conventional way in a suitable transmission unit, which together with the clutch housing (not shown) usually surrounds the clutch assembly.

The cover assembly D comprises the main cover plate 22 together with the cover member 23. The main cover plate 22 is provided with the projections 24 which serve as piloting members within the chamber 6 of the flywheel 1. The cover plate 22 is suitably fastened to the rear face of the flywheel 1 by the screws 25. The cover plate 22 is provided with a central opening 26 which is sufficiently smaller in size than the inside diameter 27 of the cover member 23, thus providing a shoulder for retaining the thrust spring 28, the outside portion of the thrust spring 28 extending within the chamber portion of the cover member 23. The cover member 23 is provided with an extension portion 29, which is further provided with a keyway 30, in which slidably operates the key 31, which is suitably fastened in the sleeve 32. The sleeve 32 can, if desired, be made a reasonably close fit around the shaft 12 to further aid in guiding the sleeve 32 in its sliding movement.

The thrust member assembly C may be constructed of a thin sheet of material formed to provide the housing portion 33 in which is contained the inner portion 34, which is preferably made of material having a crystalline nature, such as cast iron, and is preferably secured within the housing portion 33 by casting the metal of the inner portion 34 directly within the housing portion 33, thus securely fastening the inner portion 34 within the housing portion 33 in such manner as to practically make the entire thrust member assembly C an integral member. The housing portion 33 might be made of relatively thin sheet material such as steel or other suitable material which can be easily formed to the required shape to contain the inner portion 34 which is cast therein. It is well known that the friction face of a friction member constructed of steel or other similar fibrous material will tend to scuff or pick up material from an engaging member such as the friction member 16 and thus not provide satisfactory operation. However, when the thrust member assembly C is provided as in my invention with a material having a crystalline nature such as the inner portion 34, this will provide practically an ideal friction face 20 for engaging the friction member 16 without scuffing or picking up material from one of the units by the other, even when subjected to the intense heat developed in its frictional operation. If desired, the sides 35 of the housing portion 33 may be made flush with the friction face 20 or they may be slightly lower than the friction face 20. The thrust member assembly C has its housing portion 33 provided with an extension portion 36 which may be formed by displacing a portion of the wall of the housing portion 33 from its normal position at the rear of the inner portion 34, said displacement leaving the opening 37 in the rear wall of the housing portion 33, the opening 37 being filled by an extension of the inner portion 34 as it is cast in place within the housing portion 33, the extension of the inner portion 34 within the housing portion 33 thus providing additional anchorage portions for securely retaining the inner portion 34 within the housing portion 33. The extension portion 36 extends through and slidably engages the bearing portion 38 of the cover plate 22. The bearing portion 38 may be provided by setting in a separate member, as disclosed in Figs. 1 and 2, or by displacing a portion of the cover plate 22, as disclosed in Fig. 4. It will thus be seen that the extension portion 36 of the thrust member assembly C will engage the cover plate 22 and thus provide a driving means for the thrust member assembly C.

The extension portion 36 of the housing portion 33 is provided with an opening 39 in which operates the extension portion 40 of the lever 41. The levers 41 are mounted in the forked portions 42 of the yoke members 43, the levers 41 being retained in the forked portion 42 by the pin 44. The extension portion 40 of the lever 41 extends within and operates within the opening 39 of the extension portion 36 of the housing portion 33 of the thrust member assembly C. The levers 41 are provided at their inner portions with the ends 45 for engaging the openings 46 in the sleeve 47. It is to be understood that any suitable number of levers 41 together with their supporting parts may be provided in the clutch assembly, only one of these levers being shown. The portions 48 of the yoke members 43 may be provided with threaded ends for engaging the nuts 49, the nuts 49 thus fastening the yoke members 43 in position for supporting the lever 41, the yoke member further fastening the cover plate 22 and the cover member 23 together, thus retaining the thrust spring 28 therebetween.

The sleeve 47 is provided with a shoulder 50 for retaining and absorbing the end thrust of the thrust spring 28, the thrust load in the outer diameter of the thrust spring 28 being taken by the shoulder portion adjacent the central opening 26 of the cover plate 22. The cover member 23 may be provided with the openings 51 for providing air circulation within the clutch chamber 6 of the flywheel 1.

The sleeve 47 is hardened and ground so that its inner surface 52 will engage the ball members 53 without scoring. The sleeve 32 is provided with the inclined or conico-cylindrical surface 54, the inclined or conico-cylindrical surface 54 being hardened and ground to prevent scoring due to engagement of the ball members 53. The inclined or conico-cylindrical surface 54 extends around the sleeve 32 to provide engagement with the plurality of ball members 53 arranged around the sleeve 32 and within the sleeve 47.

The bearing assembly E is suitably mounted on the shoulder 55 of the sleeve 32 and is adapted to be engaged by the usual type of clutch throwout mechanism which is used for slidably moving the operating members of clutch assemblies. Any suitable number and size of ball members 53 may be provided to withstand the thrust load as developed by the clutch mechanism. The ball members 53 are retained by the inner surface 52 of the sleeve 47 and the inclined or conico-cylindrical surface 54 of the sleeve 32 together with the washer 56, which may be further retained by a resilient member 57, the resilient member 57 having offset portions to engage the washer 56 together with the shoulder portion 58 of the sleeve 32. The shoulder portion 58 may be of such diameter to slide within the sleeve 47 with the proper clearances between its outside diameter and the inner surface 52 of the sleeve 47. It is to be noted that the ball members 53 will also engage the end of the extension portion 29 of the cover member 23 when the clutch is in its engaged position, as disclosed in Figs. 1 and 3. It is also to be noted that the resilient member 57 will tend to always force the washer 56, which will in turn always tend to force the inclined or conico-cylindrical surface 54 together with the sleeve 32 and the ball members 53 to a position in which the ball members 53 will engage the inclined or conico-cylindrical surface 54 of the sleeve 32 and the inner surface 52 of the sleeve 47.

The pedal 59 is suitably mounted and supported together with its throwout shafts 60 and its throwout yoke member 61 mounted on the throwout shaft 60 in a position adjacent the bearing assembly E, so that the yoke member 61 will have a pair of arms 62 extending upwardly on each side of the shaft 12, the arms 62 being provided with rounded portions 63 which engage the rear face of the bearing assembly E. Pedal members together with the shaft 12 and yoke member 61 may be supported in the usual way on a conventional clutch housing (not shown), which may be suitably supported in connection with a flywheel housing (not shown). It is to be noted that, when the operator depresses the pedal 59, the rounded portion 63 of the yoke member 61 will engage the face of the bearing assembly E, thus forcing the bearing assembly E and the sleeve 32 to slidably move along and within the extension portion 29 of the cover member 23, this in turn forcing the inclined or conico-cylindrical surface 54 of the sleeve 32 to engage the ball members 53 and forcing the ball members 53 against the inner surface 52 of the sleeve 47.

It is to be noted that the inclined or conico-cylindrical surface 54 extends completely around the sleeve 32 and, when the sleeve 32 is moved along by the movement of the pedal 59, the ball members 53 will wedge into a locking position against the inner surface of the sleeve 47, thus causing the sleeve 47 to move forward, the walls of the openings 46 through the wall of the sleeve 47 engaging and moving the ends 45 of the lever 41 towards the thrust member assembly C. The movement of the end 45 of the lever 41 toward the thrust member assembly C will cause the extension portion 40 of the lever 41 to engage the walls of the opening 39 in the extension portion 36 of the housing portion 33 of the thrust member assembly C, this in turn causing the thrust member assembly C to be moved to a released position, as shown in Fig. 2, this released position of the clutch thus establishing the clearance spaces 64, 65, 66 and 67 between the friction members and their respective engaging surfaces. As the operator releases the pressure on the pedal 59 to allow the clutch to move from its released position as disclosed in Fig. 2 to a fully engaged position as shown in Fig. 1, the thrust spring 28 will force the sleeve 32 rearwardly to a position as shown in Fig. 1, the end 45 of the lever 41 moving with the sleeve 32, this in turn causing the extension portion 40 of the lever 41 to engage the surface 68 of the extension portion 36 of the housing portion 33, this forcing the thrust member assembly C forwardly in its engaged position with the friction members, as disclosed in Fig. 1. The sleeve 47 being still locked by the ball members 53 engaging the inclined or conico-cylindrical surface 54 of the sleeve 32, together with the inner surface 52 of the sleeve 47, will cause the sleeve 32 together with its bearing assembly E to move rearwardly to a released position relative to the ball members 53, as disclosed in Fig. 5, the sleeve 47 moving rearwardly to its position as shown in a fully engaged position of the clutch, as disclosed in Fig. 1, this corresponding to a released position of the sleeve 47, as disclosed in Fig. 5, the inclined or conico-cylindrical surface 54 of the sleeve 32 having moved rearwardly sufficiently to release the ball members 53 from their locked or engaged position with the inner surface 52 of the sleeve 32, as disclosed in Figure 5, this movement of the sleeve 47 rearwardly due to its unlocked position tending to allow the balls to slightly drop away from the inner surface 52 of the sleeve 47, the ball members 53 riding down the inclined or conico-cylindrical surface 54 of the sleeve 32. It is to be noted, however, that the ball members 53 are always maintained in contact with the end of the extension 29 of the cover member 23 by the washer 56, which is actuated by the resilient member 57 to a position engaging the ball members 53. The unlocked position of the ball members 53 as disclosed in Fig. 5 corresponding to a fully engaged position of the clutch, as disclosed in Fig. 1, will allow the thrust spring 28, every time the clutch is operated to its engaged position, as shown in Fig. 1, to cause the levers 41 to move the sleeve 47 rearwardly an additional distance, which will correspond to the amount of wear taking place on the friction members 13, 14, 15 and 16. It will thus be seen that every time the clutch is operated to its fully engaged position, as disclosed in Fig. 1 and 5, the ball members 53 will be unlocked from their engagement with the inner surface 52 of the sleeve 47 sufficiently to allow the thrust spring 28 to cause the thrust member assembly C to always move forward in engagement with the friction members 16 to take up any wear that may have occurred in the said friction members 13, 14, 15, and 16. It will also be seen that the clutch will provide automatically for taking up the wear clearance which may occur in its driving mechanism, so that the pedal 59 will not have to be adjusted to maintain in its proper operating position, as is necessary in the usual design of clutches. Also, the thrust member assembly C will not have to be manually operated in any way to take up clearance.

It is also to be especially noted that my invention will provide means that will operate continuously, while the clutch is operating in its engaged position, to take up the clearance due to wear in the plurality of friction members in the clutch assembly.

The flywheel 1 is disclosed as being provided with a starting ring 70.

It is to be noted that, when the clutch is in its fully engaged position, a slight clearance space will exist between the face of the bearing assembly E and the rounded portions 63 of the arms 62 of the yoke member 61.

The automatically adjusting mechanism together with its operatively connected parts of my invention is similar to but varies in some of its essential details from the mechanism shown in my patent application Serial No. 545,449, filed June 19, 1931.

The driving member 18 is provided with slots 71 on its outer periphery, said slots being engaged by the driving pins 72, which are suitably mounted in the holes 73 of the flywheel 1.

The friction disc 9 is provided with the boss portion 74. The friction disc 8 is provided with the boss portion 75. The hub 11 is provided with a flange portion 10. The flange member 10 is provided on both sides with angular surfaces 76, which tend to converge toward the center of the hub 11, as disclosed in Fig. 6. The angular surfaces 77 are oppositely disposed from the angular surfaces 76. The angular surfaces 76 may be separated by a flat surface 78 and the angular surfaces 77 may be separated by a flat surface 79, the flat surfaces 78 and 79 being also angularly disposed relative to the vertical plane of the friction engaging surfaces of the friction disc 18. The vibration dampening members 82 and 83 are made of rubber composition or similar material and formed with similar angular sides, which engage the oppositely disposed angular surfaces 35 of the flange member 10. The disc members 85 and 86 are also formed with similar angular faces 87 which engage the outside angular faces of the vibration dampening members 82 and 83.

To maintain the vibration dampening members 82 and 83 in close engagement with the flange member 10, the disc members 85 and 86 are fastened together by a series of members 88 being threaded into the nut 89. The lock washer 90 is interposed between the disc member 85 and the inner end of the nut 89 for locking purposes. The member 88 is provided with a pilot portion 91, which slidably engages the hole through the boss portion 75 of the friction disc 8. It is to be noted that the nut 89 extends within the hole through the boss portion 74 of the friction disc 9. The pilot portion 91 of the member 88 is provided with the slot 92 for assembling purposes. As the member 88 and the nut 89 are fastened tightly together, the flange portions of the disc members 85 and 86 will be securely clamped through the disc members 85 and 86 securely clamping the vibration dampening members 82 and 83 against the flange member 10 of the hub 11. The vibration dampening member assembly F is similar to that disclosed in my patent application Serial No. 521,933, filed March 12, 1931, with the exception that it is here adapted to absorb the driving torque transmitted to a pair of driven friction disc member assemblies.

It is to be noted that my invention herein will provide a clutch of greatly increased capacity for heavy duty motor vehicles, due to its ability of using a pair of friction disc assemblies together with means for automatically adjusting them relative to their friction engaging surfaces and to each other, this being accomplished by the means above described in which the thrust member assembly C is always maintained in its properly engaged position with the friction members, the pilot 91 of the member 88 sliding within the opening in the boss portion 75 of the friction disc 8, as the friction disc member assemblies move relative to each other, either to separate when the clutch is released or to move closer together when the clutch is automatically adjusted after wear has taken place on any of the members.

The inner portion 34 of the thrust member assembly C may be provided with the recess 96 to provide necessary operative clearance space for the lever 41.

I claim:

1. In a clutch, the combination of a revolvably mounted housing provided with an open chamber, said housing having portions of itself displaced to form inner and outer annular portions forming wall portions of its open chamber, solely cast metal filling the total space of the open chamber of said housing, said cast metal having a clutch thrust surface extending substantially flush with and unobstructedly between the edges of the inner and outer annular portions of said housing, and a revolvably mounted friction member adapted to engage the clutch thrust surface of said cast metal.

2. In a clutch comprising a friction member revolvably mounted, the combination of a housing constructed of sheet material having a central opening extending therethrough together with a U-shaped section extending circumferentially around said central opening, the inner side of said U-shaped section forming a wall portion extending for the complete horizontal length of said opening and a core of cast material filling said U-shaped section of said housing, the frictional contact of said core of cast material with the inside surfaces of said U-shaped section constituting the sole means of retaining said core of cast material from being displaced longitudinally through the open side of said U-shaped section of said housing, said mass of metal having a frictional surface adapted to movably engage said friction member.

3. In a clutch, the combination of a revolvably mounted member constructed of non-cast material provided with flange portions, a mass of cast material secured in said revolvably mounted member by being cast directly therein, said mass of cast material having a thrust surface located substantially flush with the end surfaces of the flange portions of said revolvably mounted member, and a second revolvably mounted member provided with a friction facing for engaging the thrust surface, of said mass of cast material, located substantially flush with the end surfaces of the flange portions of said first mentioned revolvably mounted member.

4. In a clutch comprising a friction member revolvably mounted, the combination of a revolvably mounted thrust member provided with a pair of flanges connected by a sole side wall, and a mass of material cast between and completely filling the space between the pair of flanges and sole side wall of said revolvably mounted thrust member, said mass of material being solely secured against longitudinal movement by adhesion developed by the operation of casting said mass of material in said revolvably mounted thrust member, said mass of metal having a frictional surface adapted to movably engage said friction member.

5. In a clutch comprising a friction member revolvably mounted, the combination of a housing provided with a pair of flanges extending at right angles to a wall extending at right angles to the axis of the clutch, said pair of flanges having their edges located substantially in a common plane, and a mass of cast material solely secured between said pair of flanges by adhesion of the contactual surfaces of said cast material with surfaces of said pair of flanges and said wall, said adhesion of said cast material with said flanges and said wall being developed by the operation of casting said mass of said cast material in said housing, said mass of metal having a frictional surface adapted to movably engage said friction member.

6. In a clutch comprising a revolvably mounted friction member, the combination of a revolvably mounted housing member constructed of sheet material and provided with a pair of flanges displaced from the plane of the sheet material and extending outwardly from a web portion formed in the plane of the sheet material, said pair of flanges extending toward said revolvably mounted friction member, and a second member for engaging said revolvably mounted friction member, said second member being anchored between said pair of flanges of said revolvably mounted housing member by being cast therein, said second member being solely connected with and retained between said pair of flanges and said web portion of said revolvably mounted housing member by contactually adhering, as a result of the casting operation, to said pair of flanges and said web portion of said revolvably mounted housing member, said casting operation of said second member in said housing member tending to fuse adjoining surfaces of said second member and said housing member to accentuate said contactual adherence therebetween.

7. In a clutch comprising a friction member revolvably mounted, the combination of a housing provided with a pair of flanges extending substantially at right angles to a wall extending at right angles to the axis of the clutch, said wall having an opening therein, said pair of flanges having their edges located substantially in a common plane, and a portion of cast material secured between said pair of flanges and said wall solely by adhesion of the contactual surfaces of said cast material with said pair of flanges and said wall, said cast material extending within said opening of said wall, said adhesion being developed by the operation of casting said cast material in said housing, said cast material having a frictional surface located in a plane adjacent said plane in which the edges of said pair of flanges are located, said frictional surface of said cast material being adapted to engage said friction member.

8. In a clutch comprising a friction member revolvably mounted, the combination of a housing member provided with a pair of flanges extending substantially equal distances from and circumferentially around inner and outer portions of a web portion connecting said pair of flanges, and a mass of material cast in contact with inner surfaces of said pair of flanges and said web portion, the surface adhesion of said mass of metal, as a result of the casting operation, to said inner surfaces of said pair of flanges and said web portions of said housing member constituting the sole means for retaining said mass of metal in said housing member, said mass of metal having a frictional surface adapted to movably engage said friction member.

JOHN W. TATTER.